United States Patent [19]

Meiklejohn

[11] 3,711,916
[45] Jan. 23, 1973

[54] METHOD OF MAKING WIRE-SPOKED WHEELS

[75] Inventor: Ian Goodhall Meiklejohn, Fife, Scotland

[73] Assignee: I. G. Meiklejohn & Company Limited, Kingslaw, Fife, Scotland

[22] Filed: Nov. 19, 1970

[21] Appl. No.: 91,100

Related U.S. Application Data

[63] Continuation-in-part of Ser. No. 837,515, June 30, 1969, Pat. No. 3,606,474.

[30] Foreign Application Priority Data

Nov. 20, 1969 Great Britain.................56,759/69

[52] U.S. Cl..............................29/159.02, 301/60
[51] Int. Cl...........................B21f 39/00, B21k 1/34
[58] Field of Search.........29/159.02, 159.01, 159.03; 301/59, 60, 55-57, 104, 105

[56] References Cited

UNITED STATES PATENTS

| 353,060 | 11/1886 | Harris | 301/59 |
| 444,430 | 1/1891 | Gedge | 301/55 |
| 886,565 | 5/1908 | Williams et al | 301/57 |
| 980,022 | 12/1910 | Thompson | 29/159.02 |
| 1,153,919 | 9/1915 | Hopkins | 23/256 X |
| 3,608,971 | 9/1971 | Seibold | 29/159.02 X |

FOREIGN PATENTS OR APPLICATIONS

| 1,007,000 | 1/1952 | France | 29/159.02 |

Primary Examiner—Charles W. Lanham
Assistant Examiner—Victor A. DiPalma
Attorney—Mason, Fenwick & Lawrence

[57] ABSTRACT

A wire-spoked wheel construction is disclosed in which wire spokes extend from a wheel rim to a centrally positioned hollow hub member open on each end with radial apertures on each end of the hub member permitting insertion of the ends of the spokes which are bent axially with respect to the hub with retaining inserts being positioned in the hub for maintaining the spokes in position ; a method of fabricating the wire-spoked wheel construction is disclosed in which a plurality of wire spokes each having two limbs are positioned with the innermost ends of the limbs extending through holes in the hub member followed by bending the inner end portions of the limbs inwardly by forcing a pair of snug fitting inserts into the hub ends to consequently tension the spokes and anchor the spokes in the hub member.

1 Claim, 8 Drawing Figures

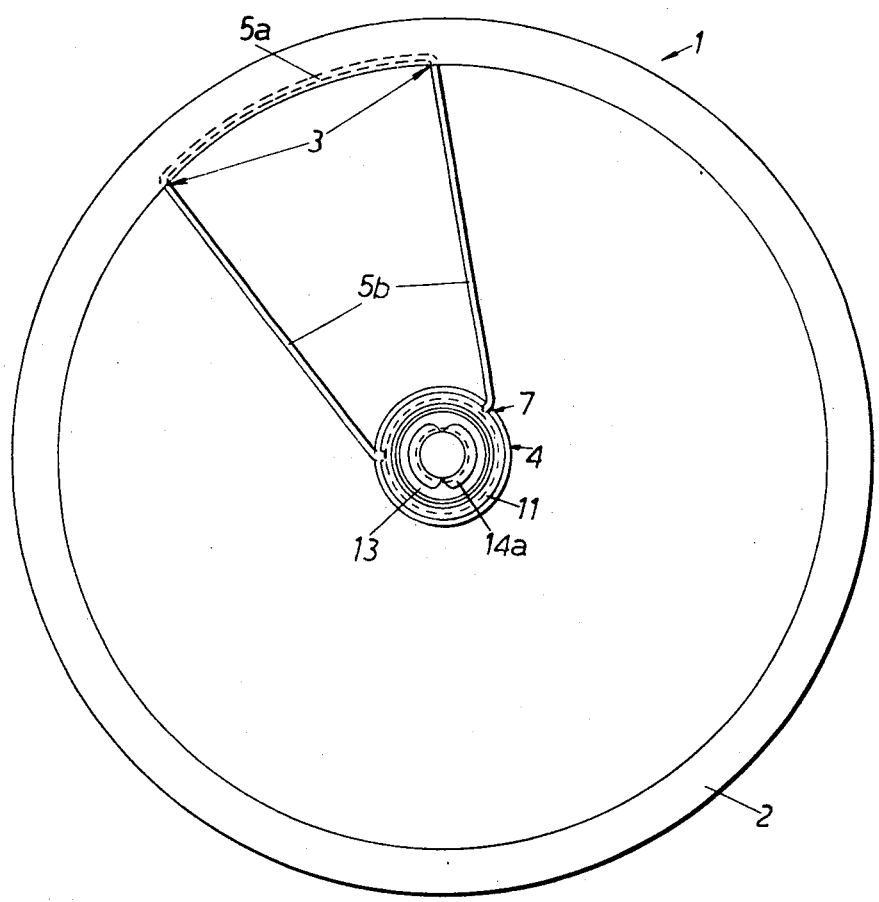

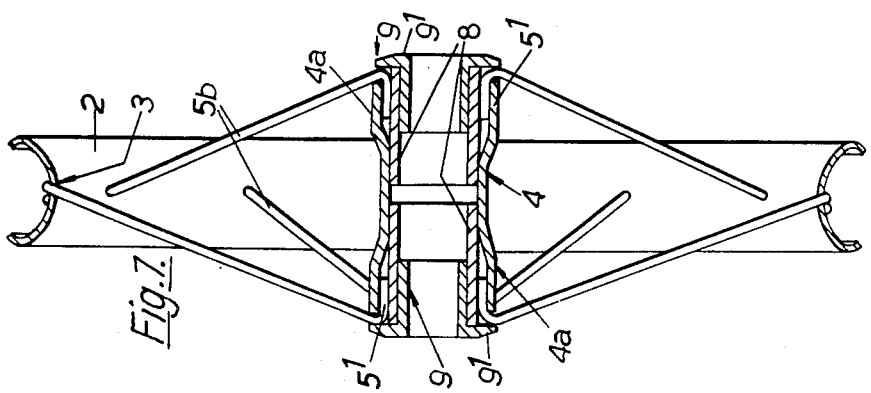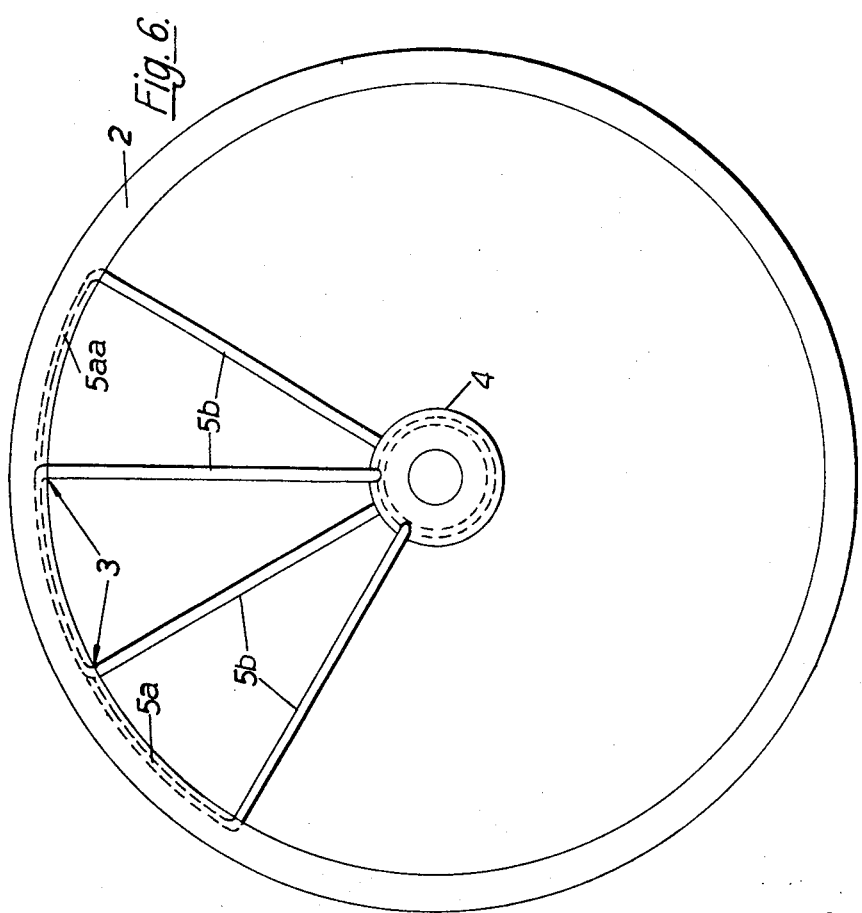

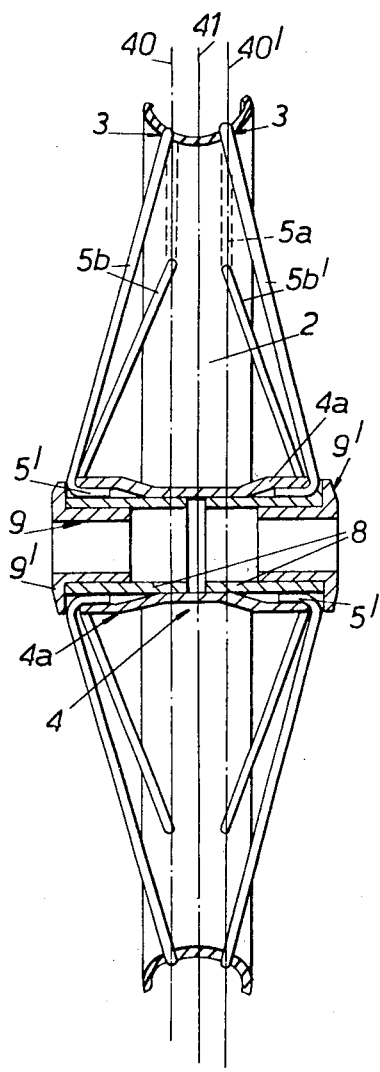

METHOD OF MAKING WIRE-SPOKED WHEELS

This application is a continuation-in-part of earlier application Ser. No. 837,515, now U.S. Pat. No. 3,606,474.

This invention concerns improvements in or relating to wire-spoked wheels.

The conventional wire-spoked wheel consists of a large number of headed spokes usually in multiples of four essentially radiating from both ends of a hub to the rim. The spokes are attached to flanges on the hub by threading them through holes in said flanges so that each head co-operates with the respective flange, and to the rim by nipples which extend through corresponding holes in the rim and which are screwed on to the spokes. Each nipple requires to be adjusted individually to achieve concentric running of the wheel. There are thus a large number of parts required, which results in considerable labor in manufacture and assembly.

An object of the present invention is to obviate or mitigate disadvantages at present inherent in the manufacture and assembly of wire-spoked wheels.

BRIEF SUMMARY OF THE INVENTION

According to the present invention there is provided a wire-spoked wheel including a rim, an axle bearing assembly comprising a hub tube and sleeving within the hub tube, and a plurality of wire spokes extending between the rim and the axle bearing assembly and having their inner end portions extending axially inwards between the sleeving and the hub tube so that the spokes rigidly support the rim on the axle bearing assembly.

Further according to the present invention there is provided a method of manufacturing a wire-spoked wheel comprising engaging a plurality of wire spokes with a wheel rim and with a hub tube so that the spokes extend therebetween with the inner end portions of the spokes being substantially normal to the axis of the bore of the hub tube, and bending the said inner end portions axially inwards by forcing a pair of sleeves respectively into opposite ends of the hub tube to form inwardly bent axial portions and thereby anchor and tension the spokes.

An embodiment of the present invention will now be described merely by way of example, with reference to the accompanying drawings, in which:

FIG. 4 is an elevation of the wheel of FIG. 3, showing only one spoke, for clarity;

FIG. 6 is a diagrammatic view of a spoked wheel having directly radial spokes;

FIG. 7 is a diagrammatic cross-sectional view partly in section of the wheel shown in FIG. 6; and FIG. 8 is a diagrammatic cross-sectional view of a modified form of wheel.

Figure 1:
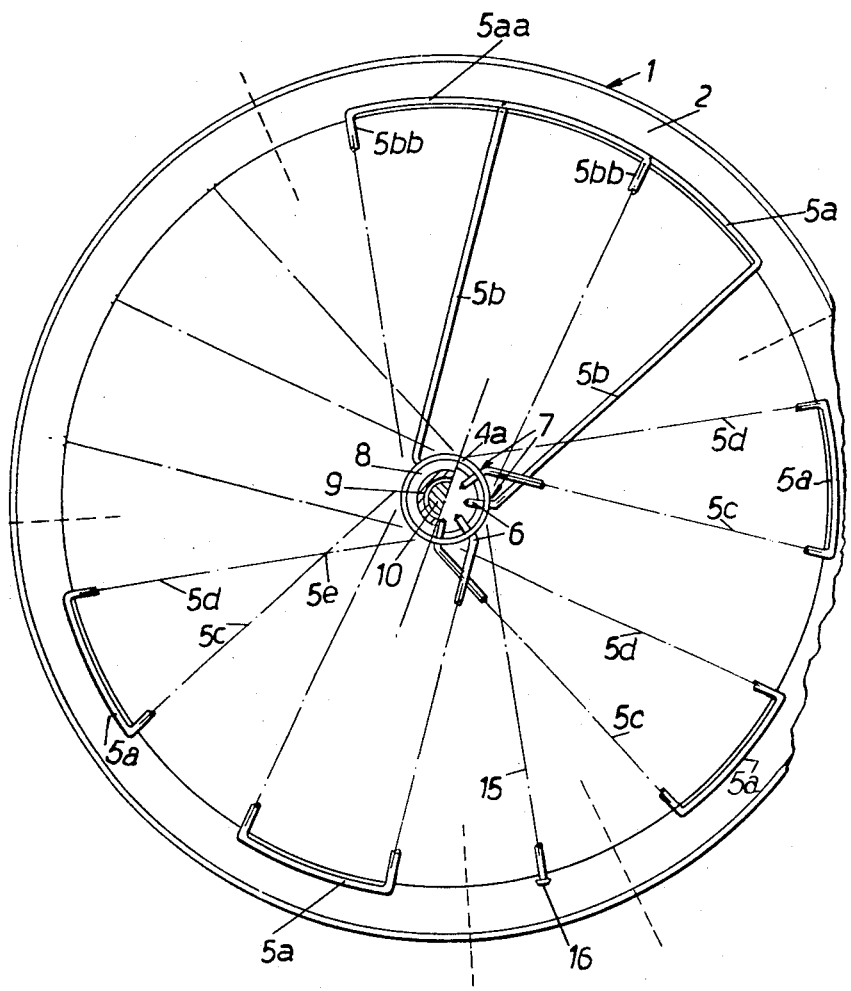
FIG. 1 is a diagrammatic view showing a spoked wheel, the drawing being used, for simplicity, to illustrate a number of different tangential spoke arrangements.
Figure 2:
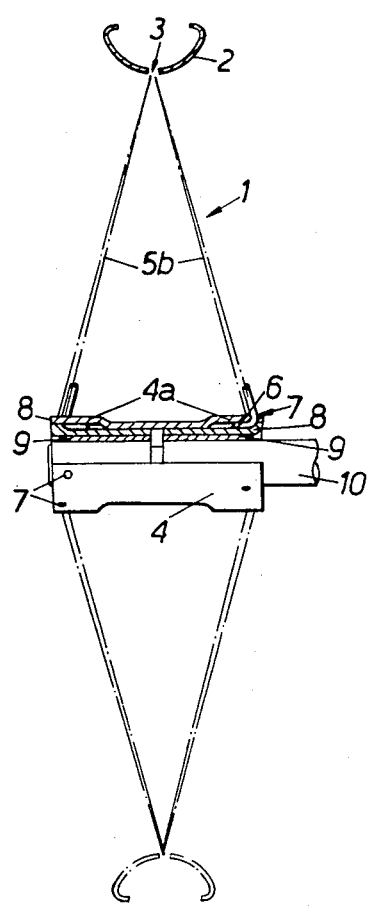
FIG. 2 is a diagrammatic cross-sectional view, partly in section, of the wheel shown in FIG. 1.

Referring to the drawings, and more particularly to FIGS. 1 and 2, a wire-spoked wheel 1 is assembled from a channel-section rim 2 having sixteen equally spaced radially disposed holes 3, a tubular hub member 4 having an enlarged-diameter portion 4a at each end, and eight double spokes each comprising two limbs 5b joined together by a curved portion 5a having a radius of curvature corresponding substantially to that of the rim 2, and an angled tail 6 on each limb 5b. The limbs 5b of each spoke pass through alternate holes 3 in the rim 2, and extend substantially tangentially to the hub member 4 where the tail 6 of each limb 5b is received in an aperture 7 in one of the enlarged-diameter portions 4a and projects radially into the bore of the hub member 4. The curved portion 5a of each double spoke is bowed slightly to allow a limb 5bb of an adjacent double spoke to pass through the hole 3 in the rim 2 by-passed by each other spoke, approximately half the length of each curved portion 5a being overlapped by approximately half the length of the curved portion 5aa of the adjacent spoke. An insert in the form of a sleeve 8 is then force-fitted through each open end of the hub member 4 and in its passage into the bore of the hub member 4 bends the tail 6 of each limb 5b, 5bb axially inwards so that the axial tail is firmly anchored between the sleeve 8 and the enlarged diameter portion 4a. The limbs 5b, 5bb are subjected to a substantially equal tension by this method of anchoring, and also to a torsional effect. A bush 9 of nylon, or other material suitable for a bearing, for example polytetrafluoroethylene, is inserted into the bore of the sleeve 8 to carry an axle or stub shaft 10. In this embodiment, the two limbs 5b of a first double spoke are received in apertures 7 at one end of the hub member 4, the limbs 5bb of an adjacent spoke in the other end of the hub member 4, and so on for alternate spokes, a limb of each spoke crossing a limb of an alternate spoke close to the hub member 4.

Figure 3:
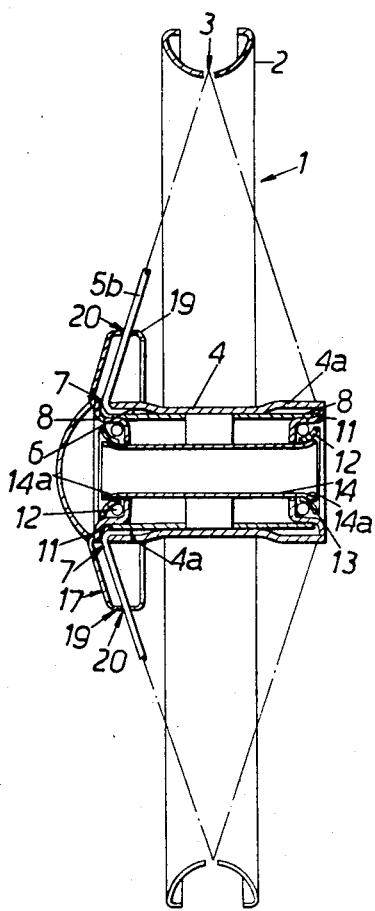
FIG. 3 is a diagrammatic cross-sectional view of a tangentially spoked wheel having a ball-bearing axle mounting.

In a modification, shown in FIGS. 3 and 4, the wheel 1 consists of a rim 2, double spokes inserted through holes 3 in the rim 2 and in the holes 7 in the hub member 4 in exactly the same manner as in the above embodiment. An insert in the form of a sleeve 8 is a press fit into each end of the hub tube 4 so that the tails 6 of the spokes are bent inwards and are retained by being pressed between the sleeve 8 and enlarged-diameter portions 4a. Ball race cups 11 are an interference fit with the sleeves 8 and form housings for ball bearings 12. Annular inner cones 13 are held by a split sleeve 14 expanded at each end 14a to retain the whole assembly, a stub shaft or axle (not shown) being carried by the split sleeve 14.

Obviously the arrangement of the spokes can be modified; for example, as shown in FIG. 1, one limb 5c of each double spoke could pass to one end of the hub tube 4 and the other limb 5d to the other end of the hub tube 4, and the said other limb may, as shown at 5c, or may not cross the direction of the said one limb. In the first case the double spokes are of similar shape, and the second case are of dissimilar shape.

In this example, in both cases the limbs 5c and 5d of each spoke pass through adjacent holes 3 in the rim 2, and the curved portions 5a do not overlap each other inside the rim 2.

Again, it is possible (FIG. 1) to use single spokes 15 each having a head 16 engaging the rim 2 to hold the spokes therein, but in this case no torsional tensioning effect is obtained on assembly because the head is free to rotate. The use of double spokes simplifies assembly and positions the tails 6 accurately, besides resisting torsion and thus increasing spoke tension.

To manufacture the spoked wheels according to the present invention, it is convenient to hold the rim 2 and the hub tube 4 concentrically in a jig and to hold the spokes in position by means of clamps. The sleeves 8 are simultaneously and forceably inserted into the hub tube 4 by means of a press whereby the projecting tails 6 are bent axially inward.

The embodiment described above is chiefly applicable to the "tangential" spoked wheel, although it can be applied to the truly (or directly) radially spoked wheel. If the spokes are directly radial from the rim to the hub it is not necessary for the spokes to pass through corresponding apertures in the hub member since the tension on the spokes during driving-in of the sleeving will be radial and will not cause any tendency towards displacement of the spokes from the hub tube. Also, the directly radial spokes do not require to be provided with angled tails, so that the jigging and assembly of directly radially spoked wheels are further simplified.

In FIGS. 6 and 7, there is shown diagrammatically a modification of the above embodiment, consisting of a directly radially spoked wheel having six double spokes. This wheel consists of a rim 2 and double spokes each having two limbs 5b, tubular hub member 4, inner sleeves 8 and bearings 9. Each spoke is comprised of a curved portion 5a or 5aa with radial limbs 5b which are straight. In assembly of the wheel the limbs of each double spoke are passed through alternate holes 3 in the rim 2 which is located in a jig and the free ends of the spokes are located in slots in a tube at the center of the jig so that the limbs 5b are precisely radial and are normal to the axis of the hub tube 4. Three double spokes are inserted through alternate holes 3 and comprise all the spokes in one side of the wheel. The hub member 4 which has an expanded portion 4a at each end is inserted in the central jig tube to rest on the limbs 5b of spokes. The three double spokes for the other side of the wheel are then inserted and located in the slots in the jig tube, these latter spokes being at 30° to the previous set of spokes; therefore the locating slots in the jig tube are in the form of a spiral which turns through 30°. Alternatively the jig tube may be replaced by twelve equally spaced pins arranged round the hub tube so that the spokes are positively located between alternate pins on each side of the wheel. Approximately half of the curved portion 5a of the spoke on one side of the wheel overlaps half of the curved portion 5aa of the spoke on the other side of the wheel within the rim 2. The action of deflecting the limbs 5b of the spokes from the center line to the ends of the hub member 4 uncovers the intermediate hole 3 in the rim 2 for the insertion of the double spoke for the other side of the wheel. This is because the curved portion 5a, 5aa of the spoke is laterally arched. The assembly is completed by simultaneously forcing the sleeves 8 into each end of the hub member 4 by means of a press. This action bends the ends 5 of the limbs 5b over the open ends of the hub tube 4, and as the sleeves 8, limbs 5b and center portion of the hub member 4 are a force fit, the limbs 5b are positively located. During the action of the press closing, provision is made to press the limbs 5b of the spokes inwards radially at the rim 2 to ensure that there is no looseness. The action of bending the limbs also tensions them. Where it is desirable to increase the degree of positive location of the spokes in the hub tube twelve notches may be provided (six at each end) to correspond with the spokes and with which they engage. The provision of notches as apertures for positive location instead of holes may also be employed in the tangential type of spoked wheel to prevent movement of the spokes at the hub after assembly. The final assembly is the insertion of bearing bushes 9 which are of nylon or other suitable bearing material. These bearing bushes 9 are an interference fit and preferably have flanges 9 to cover the open ends of the hub member 4. The wheel can be retained on an axle or stub shaft by any conventional method such as detents, washers and split pin arrangements, or a spring loaded plunger.

A rubber or other tire may be fitted on the rim as desired.

In the wheel shown in FIG. 8, the spokes have the same general form as those of FIGS. 6 and 7, except that the length of the arcuate portion 5a is smaller. The circumferentially spaced holes 3 in the rim 2 are disposed in two planes 40, 40' displaced by equal distances from and on opposite sides of the median plane 41 of the wheel, the two planes 40 and 40' being parallel to the median plane. The holes 3 may be disposed in each series in groups of four with a spacing of, for example, 7½° of arc between adjacent holes of each group and a spacing of 67½° of arc between each group of spokes. Each limb 5b of the spokes in one series lies in the same radial plane of the wheel as its neighboring limb 5b' in the other series, so that although the wheel has 32 spoke limbs only 16 limbs are visible if the wheel is viewed along its rotational axis. The manufacture of this wheel is substantially the same as that of FIGS. 6 and 7.

Figure 5:
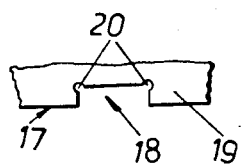
FIG. 5 is a detail of a hub cap for use with the wheels of FIGS. 1, 2, 3, 4, 5 and 6.

A hub cap 17 (FIGS. 3 and 5) may be fitted and one which engages the spokes has been found particularly suitable. This spoke-engaging hub cap 17 is substantially cup-shaped and is provided with four slots 18 equally spaced around the cap rim 19, each slot 18 being of substantially rectangular shape and having in each corner opposite the open side a substantially semicircular recess 20. The hub cap 17 snaps over the spokes, each of eight spokes being received in one of the recesses 20.

In all the embodiments and modifications of wheels according to this invention it is preferred that the difference between radius of the insert and the inside radius of the open end of the hub member be less than the diameter of the inner ends of the spoke limbs, so that the ends of the spoke limbs are gripped tightly by the action of pressing in the inserts, grooves being produced in the hub tube and inserts by deformation thereof.

In a modification of any of the embodiments described above, the inserts may be in the form of solid stub stafts or axles and be receivable in and freely rotatable in journal bearings or the like secured to the vehicle in which the wheel is to be mounted.

In a modification of the jig for assembling the wheels, the jig tube or pin-bearing block referred to above may be replaced by a block having a circular hole therein through which the inserts may pass freely, a number of slots being provided corresponding to the number of spoke limbs and being disposed radially around the circular hole. The slots are cut to a depth and angle sufficient to enable the spoke limbs to be positively located therein prior to the pressing operation.

Although the wheel has been described above as having, for example, six or eight double spokes, or 12 or 16 single spokes, it will be obvious that more or less spokes may be used depending on the rigidity required in the assembled wheel. It is usual to use the number of spokes which provides the number of limbs as a multiple of four.

By virtue of the present invention, therefore, there is provided a wire-spoked wheel having a smaller number of parts than those used heretofore with a saving in costs. The method of assembly is much simpler since there are no threaded nipples to tighten by screwing and the method thus requires less labor with a further saving in costs.

I claim:

1. A method of manufacturing a wire-spoked wheel, comprising providing a rim having a series of circumferentially spaced holes defined therein, a hub member having open end portions and a plurality of wire spokes each comprising two limbs connected by an arcuate portion having a radius of curvature substantially corresponding to that of the rim; inserting the limbs of the spokes through the holes in the rim to engage the hub member disposed coaxially with the rim so that the inner end portions of the spokes extend over the open end portions of the hub member, and bending the said inner end portions inwardly into the said open end portions by forcing a pair of inserts respectively into the open end portions to form inwardly extending substantially axially directed portions on the spoke limbs and thereby tension the spokes and positively anchor the limbs between the inserts and the respective inside surfaces of the open end portions.

* * * * *